United States Patent
Sadri et al.

(10) Patent No.: US 10,457,344 B2
(45) Date of Patent: Oct. 29, 2019

(54) CLOSURE MEMBER AND BODY OPENING ALIGNMENT VERIFICATION SYSTEM

(71) Applicant: FORD MOTOR COMPANY, Dearborn, MI (US)

(72) Inventors: Hossein Jacob Sadri, Novi, MI (US); Stephen Juszczyk, Walled Lake, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 335 days.

(21) Appl. No.: 15/389,651

(22) Filed: Dec. 23, 2016

(65) Prior Publication Data

US 2018/0178867 A1 Jun. 28, 2018

(51) Int. Cl.
*B62D 65/06* (2006.01)
*B23P 19/10* (2006.01)
*B23P 19/04* (2006.01)
*B62D 65/02* (2006.01)

(52) U.S. Cl.
CPC .............. *B62D 65/06* (2013.01); *B23P 19/04* (2013.01); *B23P 19/10* (2013.01); *B62D 65/028* (2013.01)

(58) Field of Classification Search
CPC ....... B62D 65/06; B62D 65/028; B23P 19/04; B23P 19/10
See application file for complete search history.

(56) References Cited

U.S. PATENT DOCUMENTS

| 5,910,894 | A | 6/1999 | Pryor | |
|---|---|---|---|---|
| 5,917,726 | A | 6/1999 | Pryor | |
| 6,415,191 | B1 | 7/2002 | Pryor | |
| 8,378,261 | B2 * | 2/2013 | Raje | ...................... B23K 11/115 219/137 R |
| 2018/0143088 | A1 * | 5/2018 | Sadri | ...................... B62D 65/06 |

* cited by examiner

*Primary Examiner* — John C Hong
(74) *Attorney, Agent, or Firm* — Raymond L. Coppiellie; Brooks Kushman P.C.

(57) ABSTRACT

A method is disclosed for verifying the alignment of a door with a door opening defined by a vehicle body sub-assembly. Sets of two-way sensors and a four-way sensors are used to locate feature, or hole, locations including a master hole location on the body/side. Other two-way sensors and four-way sensors are used to locate door hanging fixture pin locations on the doors before the doors are assembled to the body/side. After the doors are assembled to the body/side, two-way sensors and four-way sensors locate feature, or hole, locations on the installed doors and compare them to the previously measured master location.

15 Claims, 4 Drawing Sheets

CLOSURE MEMBER AND BODY OPENING ALIGNMENT VERIFICATION SYSTEM

TECHNICAL FIELD

This disclosure relates to a system for verifying the alignment of closure members, such as the doors, deck lid or hatchback of a vehicle, with body openings in an assembly operation.

BACKGROUND

In vehicle assembly operations, doors are assembled to a body/side sub-assembly of a Body-In-White (BIW) assembly. The BIW assembly is transferred along the body assembly line on a pallet as parts are assembled to the BIW assembly. Doors are separately assembled and are placed on a door hanging fixture before assembling the door to a door opening defined by the BIW assembly. The assembly process is generally built up based upon a rear body baseline with tolerance stack-ups progressing from the rear. Of course, the body could be built from the front to the rear but this is not the norm. For example, the rear door of a four door vehicle is used to set the front door and is assembled to the body before the front door that is followed by the front fender.

The fit of the front and rear doors to their respective door openings is critical and nonconformance to design specifications can lead to "squeaks and rattles," wind noise, water leaks, high door opening and closing effort and dust accumulation. Nonconformance can increase material costs for scrap, and can cause increased labor costs for product rework, assembly line downtime, and increased quality control audits.

This disclosure is directed to solving the above problems and other problems as summarized below.

SUMMARY

According to one aspect of this disclosure, a door assembly method comprising measuring at least two body/side locations in a body/side X/Z plane, measuring at least two door locations in a door X/Z plane while in a door hanging fixture, assembling the door to the body/side, measuring the at least two door locations in the door X/Z plane after assembly, and displaying a set of measurements on a monitor. In this disclosure, "X" refers to the longitudinal vehicle direction, "Y" refers to the lateral vehicle direction and "Z" refers to the vertical vehicle direction. Hence, the X/Z plane refers to the longitudinal/vertical plane.

According to another aspect of this disclosure, a method is disclosed that begins by sensing a vertical dimension of reference feature$_{R1}$ and longitudinal/vertical dimensions of reference feature$_{R2}$ on a body/side to establish an actual baseline longitudinal/vertical plane. A vertical dimension of reference feature$_{R3}$ and longitudinal/vertical dimensions of reference feature$_{R4}$ of a door on a fixture are sensed relative to a design baseline longitudinal/vertical plane. The door is then secured to the body/side and adjusted with the dimensions of reference feature$_{R3}$ and reference feature$_{R4}$ relative to the design longitudinal/vertical baseline being used to more closely align the door with the actual longitudinal/vertical baseline.

According to other aspects of this disclosure, the method may further comprise communicating the actual baseline longitudinal/vertical plane to a controller of a dimensional alignment verification system and communicating the vertical dimension of reference feature$_{R3}$ and longitudinal/vertical dimensions of reference feature$_{R4}$ to the controller of the dimensional alignment verification system. The vertical dimension of reference feature$_{R3}$ and longitudinal/vertical dimensions of reference feature$_{R4}$ are then compared to the actual baseline longitudinal/vertical plane to determine a first set of deviations and a status signal is generated from the controller based upon the first set of deviations. The method may also include visually displaying a representation of the first set of deviations on a monitor in response to receiving the status signal from the controller.

The method may further comprise sensing a vertical dimension of reference feature$_{R5}$ and longitudinal/vertical dimensions of reference feature$_{R6}$ of a second door on a second fixture relative to the design baseline longitudinal/vertical plane and securing the door to the body/side with the dimensions of reference feature$_{R5}$ and reference feature$_{R6}$ relative to the design longitudinal/vertical baseline adjusted toward the actual longitudinal/vertical baseline.

The method may also include the steps of communicating the actual baseline longitudinal/vertical plane to a controller of a dimensional alignment verification system and communicating the vertical dimension of reference feature$_{R5}$ and longitudinal/vertical dimensions of reference feature$_{R6}$ to the controller of the dimensional alignment verification system. The vertical dimension of reference feature$_{R5}$ and longitudinal/vertical dimensions of reference feature$_{R6}$ may be compared to the actual baseline longitudinal/vertical plane to determine a second set of deviations and a status signal may be generated from the controller based upon the second set of deviations. The method may also include visually displaying a representation of the second set of deviations on a monitor in response to receiving the status signal from the controller.

According to another aspect of this disclosure, a method is disclosed that comprises sensing a first hole with a two-way sensor and a second hole with a four-way sensor on a vehicle body sub-assembly disposed on a pallet. A first pin location is then sensed with a two-way sensor and a second pin location is sensed with a four-way sensor on a fixture having a door disposed in the fixture. The first and second holes are then correlated to the first and second pin locations. The door is then assembled to the vehicle body sub-assembly and a warning signal is generated at an in-station monitor to initiate immediate corrective action if the holes are not within a predetermined tolerance relative to the pin locations.

The method may further comprise communicating the first and second holes and the first and second pin locations to an assembly station monitor that compares the first and second holes and the first and second pin locations to an X/Z design intent zero line and to an X design intent zero line. A warning signal is then generated if the holes and pin locations are not within the predetermined tolerance when compared to the design intent zero lines.

The method may further comprise sensing a third pin location with a two-way sensor and fourth pin location with a four-way sensor on a second door hanging fixture having a second door disposed in the fixture and the first and second holes are then correlated to the third and fourth pin locations. The second door is assembled to the vehicle body sub-assembly and a warning signal is generated at an in-station monitor to initiate immediate corrective action if the holes are not within a predetermined tolerance relative to the design intent zero lines.

Alternatively, the method may further comprise locating a third pin location with a two-way sensor and a fourth pin location with a four-way sensor on a second door in a second fixture. The third and fourth pin locations may then be correlated to design intent zero lines that are calculated based upon CAD data. The second door is assembled to the vehicle body sub-assembly and the warning signal is generated if the third and fourth pin locations are not within the predetermined tolerance when compared to the design intent zero lines.

The method may further comprise communicating to a dimensional product monitoring system that compares the third and fourth pin locations and the first and second holes to a X/Z design intent zero line and to an X design intent zero line. A warning signal is then generated if the third and fourth pin locations and the first and second holes are not within a predetermined tolerance measurement when compared to the design intent zero lines.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
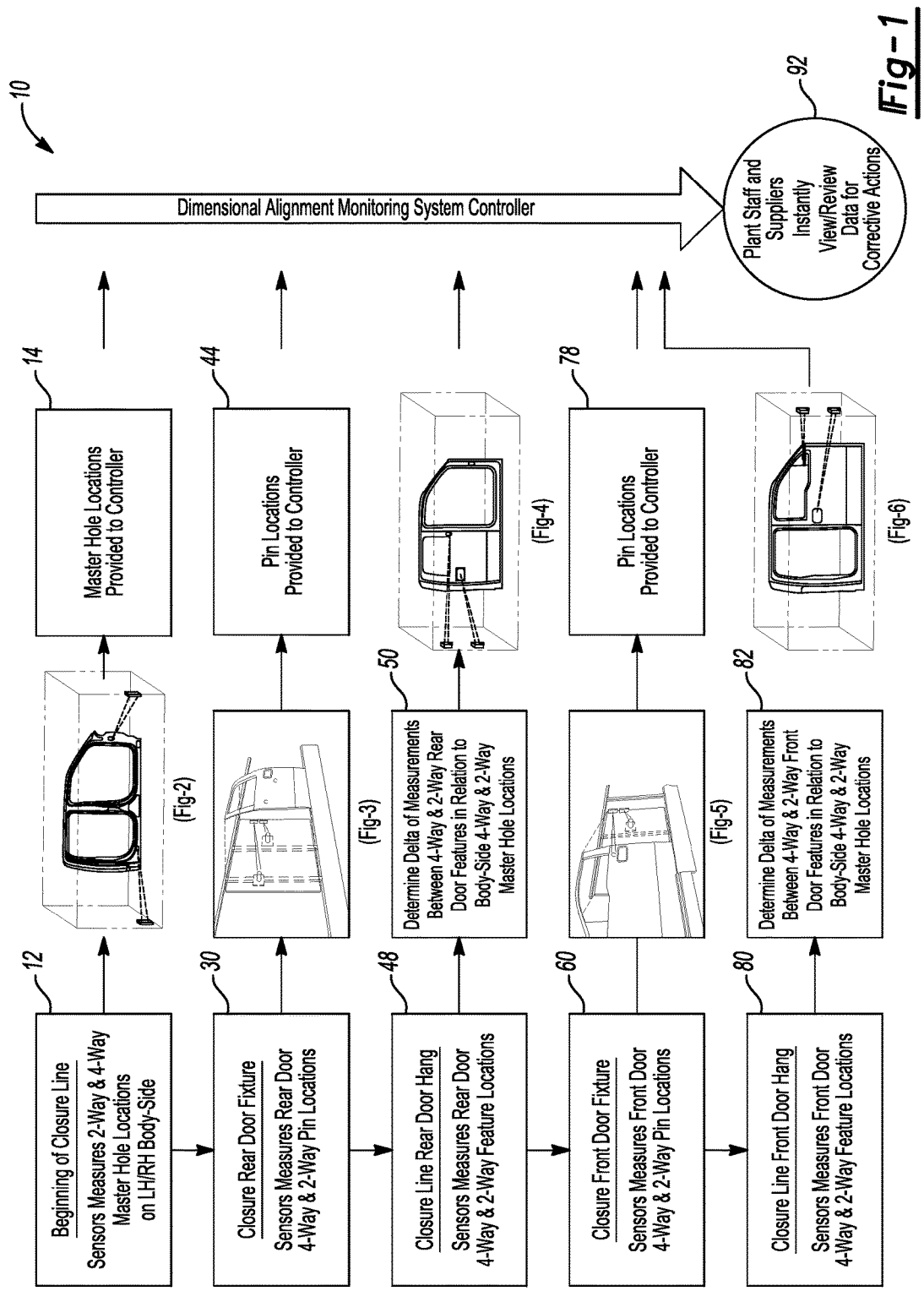
FIG. 1 is a partial process flow diagram including door installation steps for installing and verifying a location of a rear door and a front door installed in an opening in a vehicle body sub-assembly.

Referring to FIG. 1, a process flow diagram is generally indicated by reference numeral 10. The process flow diagram 10 illustrates one example of the operation of a dimensional alignment verification system for a vehicle assembly process. The process flow diagram 10 begins at the beginning of a closure line at 12 with a four-way sensor measuring the height (Z direction) and longitudinal location (X direction) of a reference feature on the body-side of a vehicle, in this case a hole in the A-pillar that is referred to as the master hole location. A two-way sensor measures the height of a reference feature on the body/side that is spaced from the master hole location, in this case a hole near the C-pillar below the rear door opening that is referred to as an anti-rotation hole location. The master hole location and anti-rotation location establish a baseline plane or X/Z plane. Master hole locations are selected on both a left-hand body/side and on a right-hand body-side. The two-way and four-way master hole locations are measured by machine vision sensors at 12 that utilize lasers to locate reference features such as holes on the body-side subassembly. The two-way and four-way master holes are communicated to a controller at 14 to identify location of the master hole and the anti-rotation hole on the body-side that are provided to the dimensional alignment verification system 26.

Figure 2:
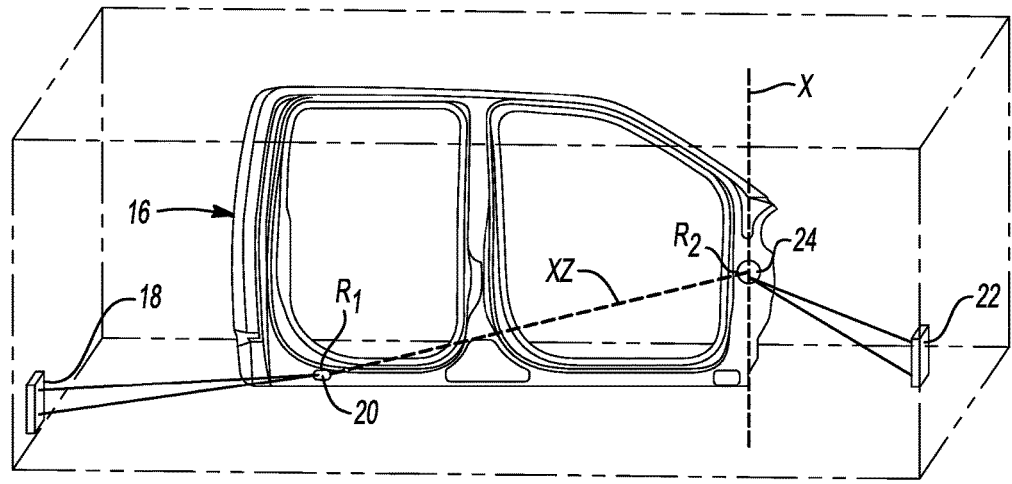
FIG. 2 is a perspective view of a right hand body/side being measured by a two-way and a four-way machine vision sensor.

Referring to FIG. 2, an example of a station in which the preceding steps 12 and 14 are performed is illustrated. An example of a body-side is generally indicated by reference numeral 16. In the station, a two-way machine vision sensor 18 mounted at the station is used to determine, for example, the actual location of a hole 20 ($R_1$) below the rear door opening near the C-pillar relative to the assembly station. A four-way machine vision sensor 22 mounted at the assembly station is used to determine the actual location of a hole 24 ($R_2$) at an intermediate location on the A-pillar relative to the assembly station that is selected as the master location. The measurements of the relative locations of the holes 20 and 24 establish an actual X zero line and an actual X/Z zero line ($axis_{bs}$) The X zero line and XZ zero line taken together establish a X/Z plane of the body/side which is the baseline for door installation. Phantom line X illustrates the X zero line. Phantom line X/Z illustrates an X and Z zero line.

Math data from the vehicle's Computer Aided Design (CAD) data is used to create an X design intent zero line and a X/Z design intent zero line extending from the rear rocker hole 20 to the intermediate A-pillar location 24. The master hole is the intermediate A-pillar hole 24 and is used as the basis for all measurements of the assembled doors and body-side 16 as will be described below. The actual X zero line and the actual an X/Z zero line are compared to the X design intent zero line and a X/Z design intent zero line to determine the deviation of the location of the body/side from the design intent location in the X/Z plane.

Referring back to FIG. 1, precision measurements of the master holes 24 is provided at 30 to the dimensional alignment verification system 26, at 44, for future reference. Precision sensor measurement of the rear door 32 is performed while the door 32 is disposed on pins on the rear door fixture 34 that are received in openings or holes in the door inner panel. Two pin locations are measured by a four-way and two-way machine vision sensors such as a Cognex™ machine vision cameras or sensors that measures the distance to the pins from the sensor locations on the fixture that are set up at a predetermined angle to monitor the pin locations. The pins are attached to the fixture at different locations for different door styles or vehicle body styles. The locations of the pins may be adjusted with shims or otherwise to fit into openings in the door inner panel. The locations of the holes in the door inner panels may vary due to door build tolerances caused by part and assembly variances. To compensate for the variances the pins on the fixture may be shimmed to align them with the holes in the door inner panel.

Figure 3:
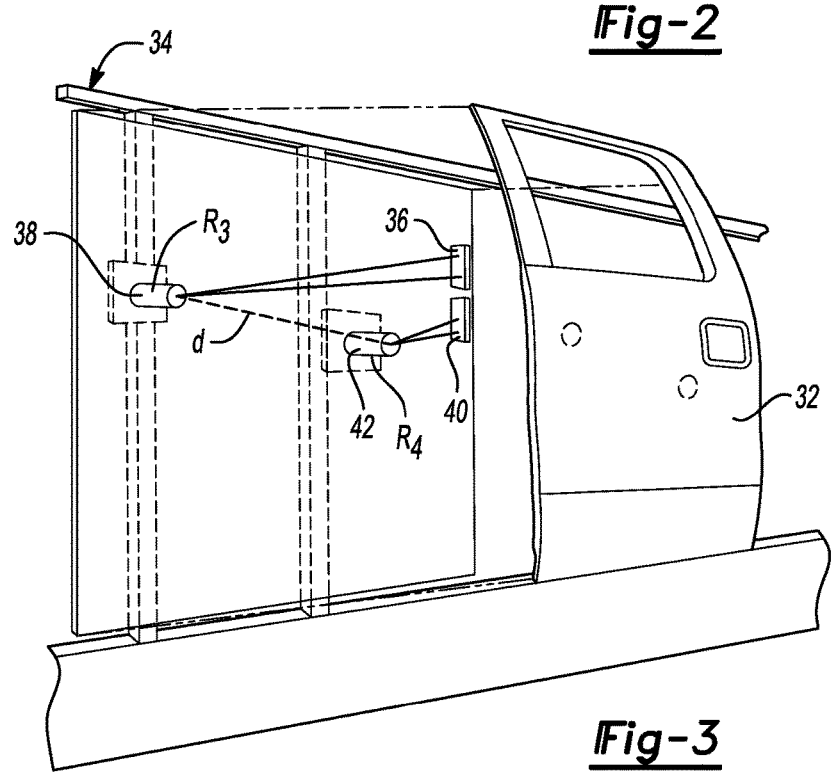
FIG. 3 is a perspective view of a right rear door disposed on a rear door hanging fixture being measured by a two-way and a four-way machine vision sensor.

Referring to FIG. 3, a rear door 32 is shown spaced from a rear door hanging fixture 34. A two-way machine vision sensor 36 is attached to the rear door hanging fixture 34 to measure the distance to a first pin 38 ($R_3$). The two-way machine vision sensor 36 is focused on the location of the first pin 38. A four-way machine vision sensor 40 is also attached to the rear door hanging fixture 34 and is aimed towards a second pin 42 ($R_4$). The four-way machine vision sensor 40 measures the distance to the second pin 42 and provides a precise X/Z position of the rear door 32 relative to the rear door hanging fixture 34. The pins 38 and 42 may be shimmed or otherwise adjusted to a limited extent to receive the rear door 32. The pins are received in holes formed in the inner panel of the rear door 32 but are permitted to move to accommodate variances in the location of the holes in the rear door 32.

Referring back to FIG. 1, the sensors 36, 40 provide information at 44 to the dimensional alignment verification system 26. The system 26 provides measurement data that is displayed on a visual monitor or may be used to generate audible alarm signal. The visual or audio alerts are provided to initiate immediate corrective actions on the line to adjust the location of the door relative to the door opening in the body/side with shims or by adjusting the hinge connection. At the rear door hanging step 48, reference feature locations such as holes are measured on the rear door 32. The rear door 32 (shown in FIG. 3) is hung on the body-side 16 and four-way and two-way sensors precisely measure the rear door location relative to the body-side at 50 at two hole locations. Delta measurements are determined by comparing the measured locations to the design locations of the holes locations on the rear door 32 and a body-side 16 by the respective four-way and two-way machine vision sensors.

Figure 4:
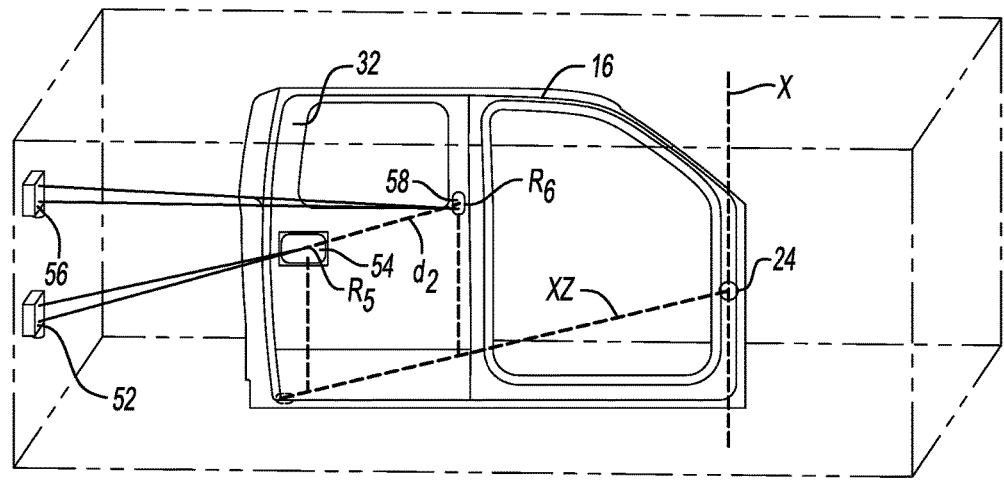
FIG. 4 is a perspective view of a right hand body/side being measured by a two-way and a four-way machine vision sensor after installation of the right rear door.

Referring to FIG. 4, the rear door 32 is shown attached to the body-side 16. A two-way machine vision sensor 52 locates a handle recess location 54 ($R_5$) in the rear door 32. A four-way machine vision sensor 56 locates a B-pillar hole 58 ($R_6$) at the beltline of the vehicle. A line $d_2$ is between the measured location of the holes 54 and 58 that corresponds to the CAD data line $D_2$ are compared to the master hole 24 that is at the intersection of the X design intent zero line and the X/Z design intent zero line. The dimensional alignment verification system 26 compares the data. Measurements of the pin locations taken at the door fixture at 48 may be compared to the measurements taken at 50 to determine whether variations in the rear door 32 or the body/side 16 are the cause of any measurement deviations.

Figure 5:
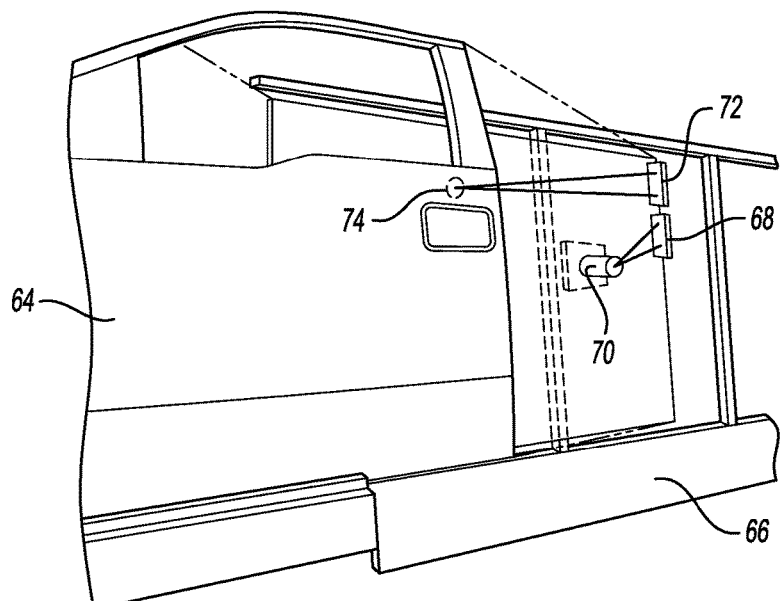
FIG. 5 is a perspective view of a right front door disposed on a front door hanging fixture being measured by a two-way and a four-way machine vision sensor.

Referring to FIGS. 1 and 5, machine vision sensors measure two pin locations at 60 on a front door fixture 66 with four-way and two-way sensors. As shown in FIG. 5, the front door 64 is shown adjacent the front door hanging fixture 66 that includes a two-way machine vision sensor 68. The two-way machine vision sensor 68 is angularly oriented to focus on a third pin 70 disposed on the front door hanging fixture 66 and measures the distance from the two-way machine vision sensor 68 to the third pin 70. A four-way machine vision sensor 72 is angularly oriented to focus on a fourth pin 74 and measures the distance between the four-way machine vision sensor 72 and the fourth pin 74.

Referring to FIG. 1, the four-way and two-way pin locations sensed in the front door fixture 66 provide location data at 78 to the dimensional alignment verification system 26. In the front door hanging step at 80 four-way and two-way machine vision sensors locate a reference feature, or hole, locations on the front door after the front door is assembled to the body/side. Measurement deltas for the front door are determined at 82 based on the actual locations of the reference features by the four-way and two-way sensors and are correlated to the body-side four-way and two-way master holes that were determined at 14 above.

Figure 6:
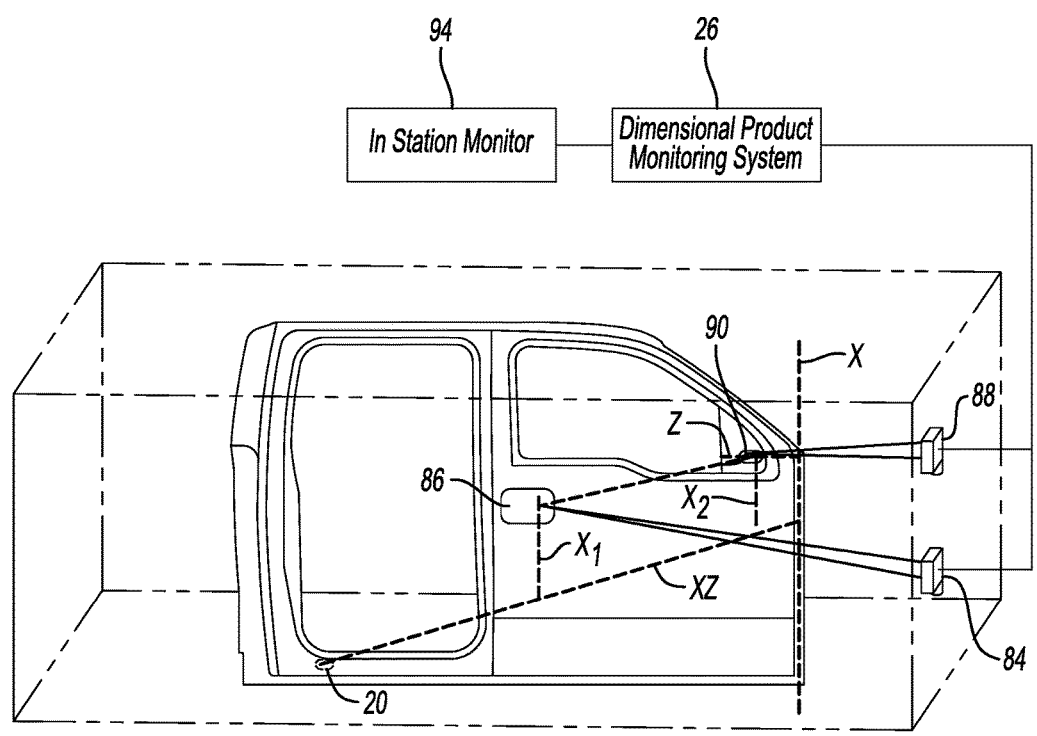
FIG. 6 is a perspective view of a right hand body/side being measured by a two-way and a four-way machine vision sensor after installation of the right rear door and right front door.

Referring to FIG. 6, a two-way machine vision sensor 84 is focused on a handle recess hole 86 and measures the distance between the two-way machine vision sensor 84 and the handle recess location 86. A four-way machine vision sensor 88 is focused on the exterior mirror hole 90 and measures the distance between the four-way machine vision sensor 88 and the exterior mirror hole 90. The location of the handle recess hole 86 and exterior mirror hole 90 are precisely determined and correlated to the master hole 24. The height of the handle recess reference feature 86 and exterior trim hole 90 are indicated by the phantom lines X1 and X2. Phantom lines X1 and X2 are measured from the actual X/Z zero line determined at 12.

Referring to FIG. 1, the delta measurements of the four-way and two-way front door relative to the body-side master holes are provided to the dimensional product monitoring system at 26 and is in turn provided to the in station monitor at 94 in FIG. 6. The precise location of the rear door 32 and front door 64 are provided in relation to the body-side 16 to the dimensional product monitoring system at 26. The in-station monitor 94 provides information to an operator that is used to take corrective action if the doors are assembled to the body-side out of tolerance. For example, the monitor may use a color coded system to display a text or graphic message in red for a major tolerance deviation, yellow for a borderline or mid-level out-of-tolerance condition, or green for an in-tolerance condition. Of course, the colors are arbitrary and other methods of indicating the extent of tolerance compliance may be selected. Other visual or audio signals may be generated to indicate the tolerance status of the door and door assembly.

If the rear door 32 and front door 64 are manually set, the monitor provides feedback for manual adjustments. If an automated or robotic door hanging tool is provided, the delta measurements relative to the master hole of the various pin or holes may be used to modify the robotic installation operation to correct any misalignment of the rear door 32 or front door 64.

The angular orientation of the machine vision sensors combined with the distance measurements precisely determines the location of the rear door 32 and front door 64 relative to the body-side 16. In robotic systems, data relating to the location of the holes and pins may be used to correct the position of the installation robot by controlling servo motors of the robotic system.

The X design intent zero line and X/Z design intent zero line are calculated by a controller based upon math data from the vehicle design CAD files. The X/Z design intent zero line is developed by measuring the two locations on the body-side 16 which in the example above is a rear rocker hole 20 and an intermediate A-pillar hole 24. Comparison to the design intent zero line provides a single location on each body-side 16 to which all of the locations sensed on the rear door 32 and front door 64 are precisely located and spaced.

The dimensional alignment verification system 26 provides information not only to the in-station monitor but may also provide the same information to plant staff and part suppliers who may instantly review or view the location data at a remote location. Dimensional adjustments can be made by installer immediately with the information relative to the three dimensional axis being provided by the in-station monitor to the manufacturing engineer on the line. The location data may be reviewed at a subsequent date by part suppliers to take long-term corrective actions in the design of the body-side or door in operation 92.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method comprising:
sensing an X/Z location of $feature_{R1}$ relative to an X/Z location of $feature_{R2}$ on a body/side to establish an $axis_{bs}$ extending through $feature_{R1}$ and $feature_{R2}$;
sensing an X/Z location of $feature_{R3}$ and X/Z location of $feature_{R4}$ of a door on a fixture to establish an $axis_d$ relative to a design $axis_D$;
securing the door to the body/side; and
sensing an X/Z location of $feature_{R3}$ and X/Z location of $feature_{R4}$ of the door as installed on the body/side and determining a difference between the X/Z location of $feature_{R4}$ and an X dimension of $feature_{R2}$ and the $axis_{bs}$.

2. The method of claim 1 further comprising:
communicating the difference between the X/Z location of $feature_{R4}$ and an X dimension of $feature_{R2}$ and the $axis_{bs}$ to a controller of a dimensional alignment verification system; and
generating a status signal from the controller based upon the difference.

3. The method of claim 2 further comprising:
displaying a representation on a monitor of the differences between the X/Z location in response to receiving the status signal from the controller.

4. The method of claim 3 further comprising:
sensing an X/Z location of $feature_{R5}$ and X/Z location of $feature_{R6}$ of a second door on a second fixture to establish an $axis_{d2}$ relative to a design $axis_{D2}$;
securing the second door to the body/side; and
sensing an X/Z location of $feature_{R5}$ and X/Z location of $feature_{R6}$ of the second door as installed on the body/side and determining a difference between the X/Z location of $feature_{R5}$ and the Z dimension of $feature_{R2}$ and an $axis_{ybs}$.

5. The method of claim 4 further comprising:
sensing a X/Z location of $feature_{R3}$ and X/Z location of $feature_{R4}$ of a door on a fixture to establish an $axis_{yd}$ relative to a design $axis_{YD}$, and
determining a difference between the X/Z location of $feature_{R3}$ and the Z dimension of $feature_{R4}$ and an $axis_{ybs}$.

6. The method of claim 5 further comprising:
communicating the difference between the X/Z location of $feature_{R4}$ and the Z dimension of $feature_{R2}$ and the $axis_{bs}$ to the controller of a dimensional alignment verification system; and
generating a status signal from the controller based upon the difference.

7. The method of claim 6 further comprising:
displaying a representation on a monitor of the differences between the X/Z location in response to receiving the status signal from the controller.

8. A method comprising:
locating a first hole with a two-way sensor and a second hole with a four-way sensor on a body/side disposed on a pallet;
locating a first pin with a two-way sensor and a second pin with a four-way sensor on a fixture supporting a door on the first and second pins on the fixture;
correlating the locations of the first and second holes to the first and second pins;
assembling the door to a vehicle body sub-assembly; and generating a warning signal at an in-station monitor to initiate immediate corrective action if the location of the holes is not within a predetermined tolerance relative to the location of the pins.

9. The method of claim 8 further comprising:
communicating the location of the first and second holes and the first and second pins to an assembly station monitor;
comparing the location of the first and second holes and the first and second pins to an X/Z design intent zero line and to an X design intent zero line; and
generating the warning signal if the holes and pin locations are not within the predetermined tolerance when compared to the design intent zero lines.

10. The method of claim 9 further comprising:
sensing a third pin location and fourth pin location with a four-way sensor on a second door hanging fixture having a second door disposed in the fixture;
correlating the first and second holes to the third and fourth pin locations;
assembling the second door to the vehicle body sub-assembly; and
generating a warning signal at an in-station monitor to initiate immediate corrective action if the holes are not within a predetermined tolerance relative to the design intent zero lines.

11. The method of claim 10 further comprising:
locating a third pin location with a two-way sensor and a fourth pin location with a four-way sensor on a second door in a second fixture;
correlating the third and fourth pin locations to design intent zero lines;
assembling the second door to the vehicle body sub-assembly; and
generating the warning signal if the third and fourth pin locations are not within the predetermined tolerance when compared to the design intent zero lines.

12. The method of claim 11 further comprising:
communicating to a dimensional alignment verification system;
comparing the third and fourth pin locations and the first and second holes to a X/Z design intent zero line and to an X design intent zero line; and
generating the warning signal if the third and fourth pin locations and the first and second holes are not within a predetermined tolerance measurement when compared to the design intent zero lines.

13. The method of claim 12 wherein the dimensional alignment verification system provides a report to an in-station visual monitor to initiate immediate corrective actions.

14. The method of claim 12 wherein the dimensional alignment verification system provides a report to part manufacturers to initiate part modifications.

15. A door assembly method comprising:
measuring at least two body/side locations in a body/side X/Z plane;
measuring at least two door locations in a door X/Z plane while in a door hanging fixture;
assembling the door to the body/side;
measuring the at least two door locations in the door X/Z plane after assembly; and
displaying a set of measurements on a monitor.

* * * * *